United States Patent
Foley

[15] 3,662,850
[45] May 16, 1972

[54] MOUNTING MEANS FOR SWITCHES INSTRUMENTS OR THE LIKE

[72] Inventor: David Foley, Burnley, England
[73] Assignee: Joseph Lucas (Industries) Limited, Birmingham, England
[22] Filed: Oct. 7, 1969
[21] Appl. No.: 864,504

[30] Foreign Application Priority Data

Oct. 15, 1968   Great Britain......................48,842/68

[52] U.S. Cl..................................180/90, 180/82, 248/223
[51] Int. Cl.....................................................B60k 35/00
[58] Field of Search........................180/89, 90, 82; 248/223; 339/91 F, 119, 123, 125; 174/53; 200/168

[56] References Cited

UNITED STATES PATENTS

| | | | |
|---|---|---|---|
| 459,844 | 9/1891 | Thomas | 248/223 X |
| 1,775,654 | 9/1930 | Myers | 200/168 B UX |
| 1,795,106 | 3/1931 | Caesar | 180/89 |
| 2,708,088 | 5/1955 | Steinke | 248/223 |
| 2,778,869 | 1/1957 | Bentley | 174/53 |
| 3,176,062 | 3/1965 | Nordstrom et al. | 248/223 X |
| 3,274,450 | 9/1966 | Siebold | 248/223 X |
| 2,865,222 | 12/1958 | Bachman | 280/87.3 X |
| 2,899,214 | 8/1959 | D'Antini | 280/87.3 |
| 3,556,550 | 1/1971 | Franchini | 280/87 A |
| 3,534,938 | 10/1970 | Jordan et al. | 298/223 X |

FOREIGN PATENTS OR APPLICATIONS

| | | | |
|---|---|---|---|
| 270,122 | 8/1950 | Germany | 200/168 B |
| 521,568 | 8/1953 | Italy | 180/90 |

OTHER PUBLICATIONS

Federal Pacific, Catalog No. 1-125R, Newark, New Jersey, 1958, "Stab-lok" p. 9 and 10.

Primary Examiner—Benjamin Hersh
Assistant Examiner—John P. Silverstrim
Attorney—Holman & Stern

[57] ABSTRACT

Mounting means for instruments, switches or the like in road vehicles. The mounting means includes a mounting frame which can be attached to a panel of a road vehicle. A part associated with the instrument, switch or the like is engaged in an aperture in the mounting frame, and the mounting frame and said part include co-acting parts for pivotally interconnecting said part and the frame. In addition, said part and said frame include co-acting releasable catch means positioned in use between the axis about which the part can pivot relative to the frame, and the passenger compartment of the vehicle said co-acting catch means serving to hold the part against pivotal movement relative to the frame until the part has sufficient force applied thereto to release said catch means. Sufficient force is applied to said part for example, in the event of an occupant of the vehicle striking the instrument, switch or the like when the vehicle is involved in a collision, whereupon said catch means is freed, and said part is free to pivot relative to the frame in a direction away from the passenger compartment of the vehicle, thereby minimizing the risk of injury to said occupant of the vehicle.

2 Claims, 8 Drawing Figures

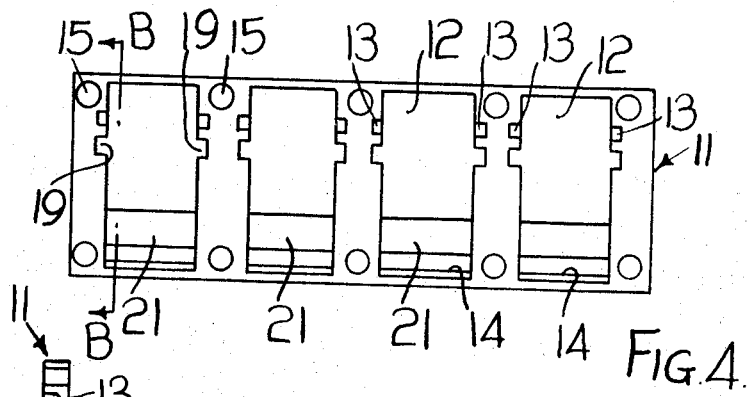
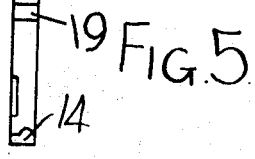
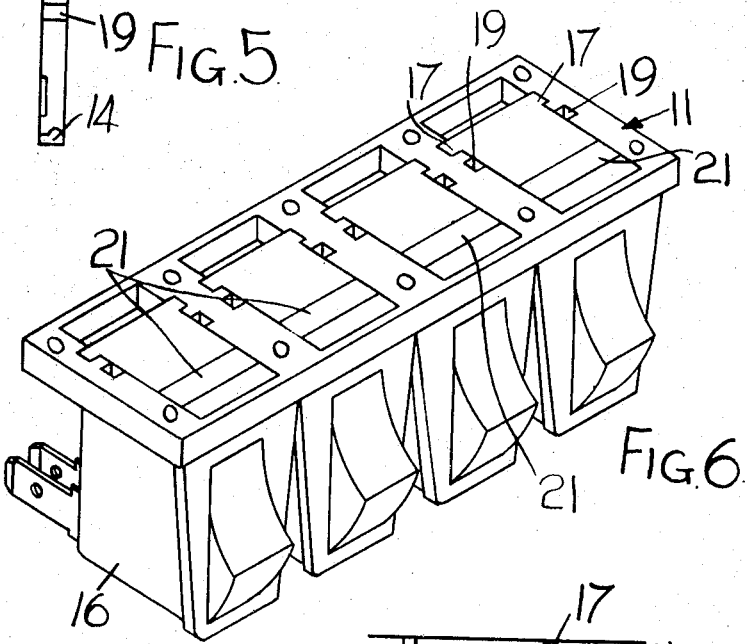
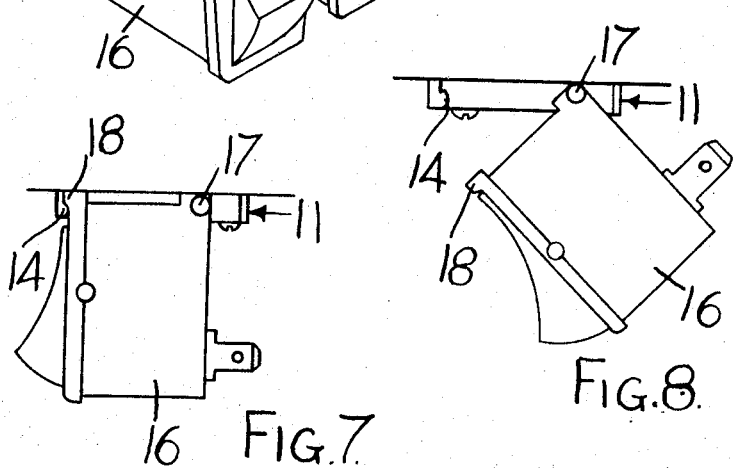

ons, switches or the like.

A mounting means according to the invention includes a mounting frame, means whereby the mounting frame can be attached to a panel of a road vehicle, a part engaged in an aperture in the mounting frame, said part having associated therewith the instrument, switch or the like, co-acting parts on said part and the frame serving to pivotally interconnect the part and the frame, and co-acting releasable catch means on the part and the frame, said catch means being positioned, in use, between the axis about which the part can pivot relative to the frame, and the passenger compartment of the vehicle, and serving to hold the part against pivotal movement relative to the frame, until the part has sufficient force applied thereto to release said catch means, for example in the event of an occupant of the vehicle striking the instrument, switch or the like when the vehicle is involved in a collision, whereupon said part is free to pivot relative to the frame in a direction away from the passenger compartment of the vehicle, thereby minimizing the risk of injury to said occupant of the vehicle.

One example of the invention is illustrated in the accompanying drawings wherein.

Figure 1:
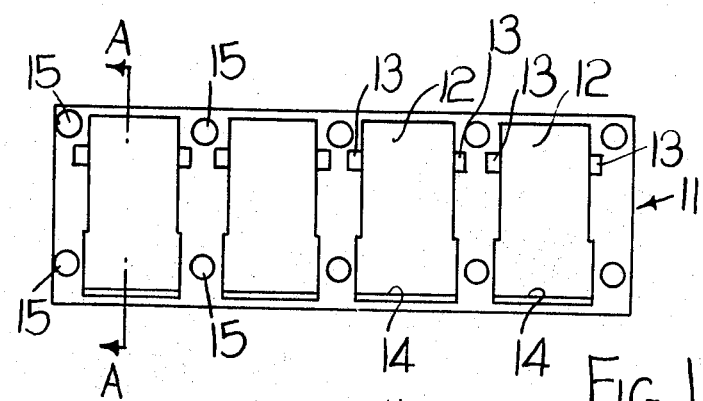
FIG. 1 is a plan view of the mounting frame of a switch assembly.
Figure 3:
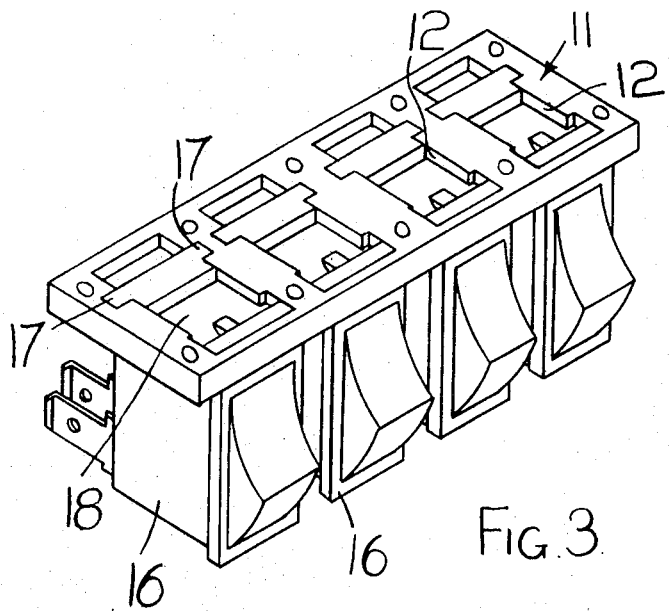

FIG. 3 is a perspective view of the frame shown in FIG. 1 having a plurality of switches engaged therewith, FIG. 4 is a plan view of a modification of the frame shown in FIG. 1, FIG. 5 is a sectional view on the line B—B in FIG. 4, FIG. 6 is a perspective view of the frame shown in FIG. 4, having a plurality of switches engaged therewith, and FIGS. 7 and 8 are part section side elevational views of the frame shown in FIG. 1 together with a switch, illustrating the action of the assembly.

Figure 2:
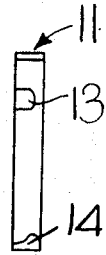
FIG. 2 is a sectional view on the line A—A in FIG. 1.

Referring first to FIGS. 1 to 3 of the drawings, the switch assembly includes a mounting frame 11 which is moulded in synthetic resin material, and which includes a plurality of generally rectangular apertures 12. The longer walls of the apertures 12 are each formed with a recess 13, and the recesses 13 are aligned. The shorter walls of the apertures 12, remote from the recesses 13, include respective, integral ribs 14. The frame 11 is formed with a plurality of holes 15, whereby the frame 11 is secured, in use, in facial contact with a lower, horizontal, surface of the dashboard of a road vehicle.

The bodies 16 of the switches to be engaged with the frame 11 are generally rectangular in cross-section, and each includes a pair of integral outwardly extending, axially aligned, cylindrical pegs 17 extending parallel with the top surface of the switch body from the upper corners of the switch body. The pegs 17 are so dimensioned, that they can be engaged in the recesses 13. Extending from the edge of the upper surface of the body 16 of each switch, adjacent the operating member of the switch, is an integral lug 18.

The switch assembly is assembled in the following manner. The dimensions of the body 16 of each switch are such that the body 16 can be inserted through its respective aperture 12 in the frame 11. The switches are inserted through their respective apertures 12 in the frame until the pegs 17 engage in their respective recesses 13, and the lug 18 engages the respective rib 14. The frame member 11 is then secured to the dashboard of the road vehicle, and it will be appreciated, that when the fame 11 is secured in position in the switches project downwardly from the dashboard of the road vehicle with their operating members presented towards the driver of the vehicle.

The switches are operated in the normal manner, and it will be realized that when a force is applied to the surface of a switch presented towards the driver of the road vehicle, then there is a tendency for the switch to pivot relative to the frame member 11 about the pegs 17. This tendency is normally resisted by the engagement of the respective lug 18 with the rib 14 of the frame member 11, but since the frame member 11 and the body of the switches are moulded in synthetic resin material, they have a certain inherent resilience, and should the surface of any of the switches presented towards the driver of the vehicle be struck forcibly, the lug 18 of the switch will be forced passed the respective rib 14, whereafter the switch will be free to pivot relative to the frame member 11 about the respective pegs 17, so as to allow the switch to move in a direction away from the driver of the road vehicle. Thus, should the driver or another occupant of the vehicle be thrown against a switch, for example in the event that the vehicle is involved in a collision, then the switch will be caused to pivot relative to the frame 11 thereby minimizing the risk of injury to the driver or other occupant of the vehicle. It will be appreciated that the pegs 17 of the switches cannot ride out of the recesses 13 in an upwards direction, since the upper ends of the recesses 13 are closed by the panel to which the frame 11 is secured.

In the construction described above, the shape of the body 16 of the switches is limited in that the body of a switch must be capable of being inserted through its respective aperture 12 in the frame 11. However, for styling reasons, it may be desirable to utilize switches which are so shaped that they cannot be inserted through their respective apertures. The modification shown in FIGS. 4, 5 and 6 permits the mounting of such switches.

Referring now to FIGS. 4, 5 and 6, there is provided a mounting frame 11 which includes all the features of the mounting frame 11 shown in FIG. 1, with the addition that the longer walls of the apertures 12 are provided, adjacent the recesses 13, with channels 19 of width equal to the diameter of the pegs 17 of the respective switches. The major parts of the bodies 16 of the switches to be engaged with the mounting frame can be of any desired configuration, provided that the upper portion thereof, carrying the pegs 17 and the lugs 18 can be inserted into their respective apertures 12.

In order to assemble the modified switch assembly, the switches are tilted relative to the frame 11, and the pegs 17 are engaged in the lower end of the respective channels 19. The switches are then moved upwardly relative to the frame 11 so that the pegs 17 slide upwardly in the channels 19 and eventually disengage from the upper ends of the channels 19. The switches are then moved rearwardly relative to the frame 11 so that the pegs 17 pass over their respective recesses 13, and then the switches are moved upwardly, so that their lugs 18 are positioned to the rear of, and above the respective ribs 14 of the frame 11. The switches are then moved forwardly and downwardly, to engage the pegs 17 with their respective recesses 13, and the lugs 18 with their respective ribs 14. The frame 11 is then secured in position as described above. Thus, the switch assembly can be assembled without the necessity of inserting the switches completely through their respective apertures in the frame 11. The action of the switches in the event that they are struck forcibly is identical with that described in relation to the constructions shown in FIGS. 1, 2 and 3. In some applications it is undesirable to mount the above assembly in contact with a panel, and so in order to hold the switches against upward movement relative to the frame 11 the frame is provided with integral webs 21 which extend across the apertures 12.

It will be appreciated that the frames 11 can be made in any desired length, so that any number of switches can be accommodated. Moreover, although the switches shown in the drawings have rocker type operating members, switches having toggle type operating members can be mounted in an identical manner.

It will be appreciated that the frame 11 can be utilized to support instruments in a road vehicle, the instruments being provided with parts which mate with the frame in a manner similar to the manner in which the switches mate with the frame.

Having thus described my invention what i claim as new and desire to secure by Letters Patent is:

1. Mounting means for devices such as road vehicle instruments and switches comprising, a mounting frame defining an aperture, means whereby the mounting frame can be secured to a panel member of a road vehicle, a device carrier engaged in said aperture in the mounting frame, co-acting parts on the frame and the carrier serving to pivotally mount the device carrier for pivotal movement on the frame, and, use, pivoting further co-acting parts on the device carrier and the frame, the further co-acting parts defining releasable catch means for retaining the carrier against pivotal movement relative to the frame, and said catch means being positioned between the axis about which the carrier can pivot relative to the frame, and the edge of the frame which is, in sue, presented to the passenger compartment of the vehicle, the catch means being releasable to permit pivoting of the carrier in a direction away from said frame edge by the application of a predetermined force to the carrier, and said predetermined force being so chosen as to be less than a force applied to the carrier by an occupant of the vehicle striking a device carried by the carrier in a manner to cause injury to that occupant in the event that the vehicle is involved in a collision, but being greater than the force which may be applied to the device in the course of normal operation of the device, wherein the dimensions of the device carrier, and the dimensions of said aperture in said frame are so related that said device carrier can pass through said aperture to permit assembly of the carrier to the frame.

2. Mounting means for devices such as road vehicle instruments and switches comprising, a mounting frame defining an aperture, means whereby the mounting frame can be secured to a panel member of a road vehicle, a device carrier engaged in said aperture in the mounting frame, co-acting parts on the frame and the carrier serving to pivotally mount the device carrier for pivotal movement on the frame, and, further co-acting parts on the device carrier and the frame, the further co-acting parts defining releasable catch means for retaining the carrier against pivotal movement relative to the frame, and said catch means being positioned between the axis about which the carrier can pivot relative to the frame, and the edge of the frame which is, in use, presented to the passenger compartment of the vehicle, the catch means being releasable to permit pivoting of the carrier in a direction away from said frame edge by the application of a predetermined force to the carrier, and said predetermined force being so chosen as to be less than a force applied to the carrier by an occupant of the vehicle striking a device carried by the carrier in a manner to cause injury to that occupant in the event that the vehicle is involved in a collision, but being greater than the force which may be applied to the device in the course of normal operation of the device, wherein said co-acting parts on the frame and the carrier include a pair of pivot posts projecting from the carrier, and a pair of recesses in the frame, said posts being engageable in said recesses to pivotally mount the carrier on the frame, and the frame being provided with channels adjacent the recesses whereby that portion of the carrier having said pivot posts can be inserted through the frame by way of the channels to permit engagement of the pivot posts in said recesses without inserting the carrier completely through the aperture in the frame.

* * * * *